(12) United States Patent
Lee

(10) Patent No.: US 11,434,845 B2
(45) Date of Patent: Sep. 6, 2022

(54) INDUSTRIAL VEHICLE WORK GUIDE SYSTEM

(71) Applicant: DOOSAN CORPORATION, Seoul (KR)

(72) Inventor: Byung Kwon Lee, Incheon (KR)

(73) Assignee: DOOSAN INDUSTRIAL VEHICLE CO., LTD., Incheon (KR)

( * ) Notice: Subject to any disclaimer, the term of this patent is extended or adjusted under 35 U.S.C. 154(b) by 889 days.

(21) Appl. No.: 16/322,527

(22) PCT Filed: Aug. 2, 2017

(86) PCT No.: PCT/KR2017/008330
§ 371 (c)(1),
(2) Date: Feb. 1, 2019

(87) PCT Pub. No.: WO2018/026187
PCT Pub. Date: Feb. 8, 2018

(65) Prior Publication Data
US 2021/0372341 A1    Dec. 2, 2021

(30) Foreign Application Priority Data
Aug. 2, 2016   (KR) .................. 10-2016-0098384

(51) Int. Cl.
*B66F 9/075*   (2006.01)
*E02F 9/20*    (2006.01)
(Continued)

(52) U.S. Cl.
CPC ........ *F02D 41/2429* (2013.01); *B66F 9/0759* (2013.01); *B66F 9/07572* (2013.01);
(Continued)

(58) Field of Classification Search
CPC ......... F02D 41/2429; F02D 2200/0625; F02D 2200/1002; F02D 2200/101;
(Continued)

(56) References Cited

U.S. PATENT DOCUMENTS

| 4,212,360 A | 7/1980 | Chesher |
| 2005/0092530 A1 | 5/2005 | Rice |

(Continued)

FOREIGN PATENT DOCUMENTS

| JP | 2009-168655 A | 7/2009 |
| JP | 2015-140800 A | 8/2015 |

(Continued)

OTHER PUBLICATIONS

Translated and annotated Sakamoto (JP-2015140800) (Year: 2015).*

(Continued)

*Primary Examiner* — James M Mcpherson
*Assistant Examiner* — Kyle J Kingsland
(74) *Attorney, Agent, or Firm* — Volpe Koenig

(57) ABSTRACT

An industrial vehicle work guide system is disclosed. An industrial vehicle work guide system according to an embodiment of the present invention includes: a memory configured to store engine used data, a driving time, a fuel consumption amount, and reference fuel efficiency; a display module configured to output a guide message; and an analysis module configured to calculate actual fuel efficiency by using the engine used data, the driving time, and the fuel consumption amount, compare the actual fuel efficiency with the reference fuel efficiency, and control the display module so that the display module outputs a guide message when the actual fuel efficiency is lower than the reference fuel efficiency.

7 Claims, 4 Drawing Sheets

(51) Int. Cl.
 G07C 5/08 (2006.01)
 F02D 41/24 (2006.01)
(52) U.S. Cl.
 CPC .......... *E02F 9/2025* (2013.01); *G07C 5/0808* (2013.01); *F02D 2200/0625* (2013.01); *F02D 2200/101* (2013.01); *F02D 2200/1002* (2013.01)
(58) Field of Classification Search
 CPC .. B66F 9/07572; B66F 9/0759; E02F 9/2025; G07C 5/0808
 See application file for complete search history.

(56) References Cited

U.S. PATENT DOCUMENTS

| | | | |
|---|---|---|---|
| 2011/0206483 A1 | 8/2011 | Gauthier | |
| 2015/0346009 A1* | 12/2015 | Chun | F02D 41/00 73/114.53 |
| 2016/0082905 A1* | 3/2016 | Hsu | G07C 5/0808 701/123 |
| 2016/0252381 A1* | 9/2016 | Kwak | G01F 9/00 701/123 |

FOREIGN PATENT DOCUMENTS

| | | |
|---|---|---|
| KR | 10-1999-0018156 A | 3/1999 |
| KR | 20-0344391 A | 3/2004 |
| KR | 10-0906821 B1 | 7/2009 |
| KR | 10-2012-0085610 A | 8/2012 |
| KR | 10-2014-0084409 A | 7/2014 |
| KR | 10-1625682 B1 | 5/2016 |
| WO | 2015/114909 A1 | 8/2015 |

OTHER PUBLICATIONS

Translated and annotated Kim (KR 20140084409) (Year: 2014).*
International Search Report issued in corresponding International Patent Appln. No. PCT/KR2015/013392 dated Sep. 1, 2016, consisting of 5 pp. (English Translation Provided).
Written Opinion issued in corresponding International Patent Appln. No. PCT/KR2015/013392 dated Sep. 1, 2016, consisting of 9 pp. (English Translation Provided).
Search Report issued in corresponding European Patent Application No. 17837238.9 dated Jul. 16, 2019, consisting of 7 pp.

* cited by examiner ical Field

The present invention relates to an industrial vehicle work guide system.

BACKGROUND ART

A forklift is a representative industrial vehicle used for lifting and loading and unloading cargo having relatively large weight or used for lifting cargo having large weight and transporting the cargo to a position desired by a worker. An excavator operates working machinery by using an operation lever, an operation pedal, and the like within a cabin or an operating room. When the operation lever, the operation pedal, and the like are operated in the state where the forklift starts, a hydraulic cylinder or a hydraulic actuator is operated, so that the working machinery performs work.

The representative work of the forklift is work of lifting and loading and unloading cargo having large weight, work of transporting cargo, and the like, and in the repeated work, it is known that a work operation pattern of a skilled operator improves efficiency of an operation capacity and considerably improves fuel efficiency. However, even though work is performed in the same work environment by using the same equipment, unskilled operators or beginners have different work operation patterns, for example, a degree of pushing the operation pedal of the operation pedal or an operation direction of the operation lever, or the operation amount, and are not accustomed to control an operation time of the operation pedal and/or the operation lever, so that the working machinery is inefficiently operated, and depending on the case, there is a problem in that the working machinery is excessively lifted or is unnecessarily operated, so that fuel efficiency is wasted and an operation capacity is increased. In the related art, an efficient work guide system for unskilled people or beginners is not provided, so that there is a problem in that unskilled people or beginners inevitably need to acquire an efficient work operation pattern through a repeated experience while spending lots of time and making many efforts in an actual work field for a long time.

DISCLOSURE

Technical Problem

The present invention is conceived to solve the foregoing problems in the related art, and an object of the present invention is to provide an industrial vehicle work guide system, which is capable of providing a driver with guidance so as to improve fuel efficiency during an operation of an industrial vehicle.

Technical Solution

In order to solve the foregoing problems, an exemplary embodiment of the present invention provides an industrial vehicle work guide system, including: a memory configured to store engine used data, a driving time, a fuel consumption amount, and reference fuel efficiency; a display module configured to output a guide message; and an analysis module configured to calculate actual fuel efficiency by using the engine used data, the driving time, and the fuel consumption amount, compare the actual fuel efficiency with the reference fuel efficiency, and control the display module so that the display module outputs a guide message when the actual fuel efficiency is lower than the reference fuel efficiency.

In this case, the engine used data may include information about an engine speed and an engine output.

Further, the analysis module may extract an engine speed, which is most frequently used by an operator, from the engine used data, compare the extracted engine speed, which is most frequently used by the operator, with a preset most efficient engine speed, and output the guide message through the display module so that the engine speed, which is most frequently used by the operator, is close to the most efficient engine speed.

Further, the reference fuel efficiency may be fuel efficiency when reference work consisting of two or more of load loading/unloading work, inching work, traveling work, complex operation work is performed.

Further, the reference fuel efficiency may include fuel efficiency (L/hr) defined with a fuel consumption amount per driving time (hr).

Further, the reference fuel efficiency may include a work amount per hour (Cycle/hr) defined with a work cycle per driving time (hr).

Further, the industrial vehicle work guide system may further include a load sensor configured to measure weight of the cargo loaded on the industrial vehicle, in which the analysis module may calculate the work cycle based on pressure measured by the load sensor.

Further, the reference fuel efficiency may be defined with a fuel consumption amount per work cycle (Cycle).

Further, the reference fuel efficiency may be set based on each cargo located on the industrial vehicle and each engine speed.

Advantageous Effects

According to the exemplary embodiment of the present invention, actual fuel efficiency of an operator is compared with reference fuel efficiency by the analysis module and when the actual fuel efficiency is lower than reference fuel efficiency, a guide message is output through the display module, thereby improving fuel efficiency of the industrial vehicle regardless of a skill level of the operator.

BEST MODE FOR CARRYING OUT THE INVENTION

Figure 1:
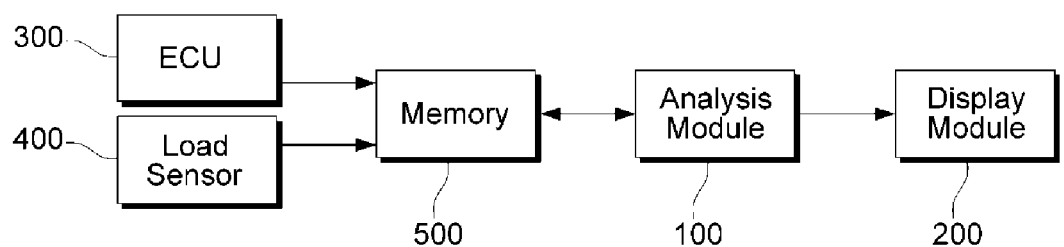
FIG. 1 is a diagram illustrating a general configuration of an industrial vehicle work guide system according to an exemplary embodiment of the present invention.

Hereinafter, an exemplary embodiment of the present invention will be described in detail with reference to the accompanying drawings. First of all, we should note that in giving reference numerals to elements of each drawing, like reference numerals refer to like elements even though like elements are shown in different drawings. In the following description of the exemplary embodiment, a detailed description of known configurations or functions incorporated herein will be omitted when it is judged that the detailed description may make the subject matter of the present disclosure unclear.

An industrial vehicle work guide system according to an exemplary embodiment of the present invention is for the purpose of actively inducing a fuel efficient operation habit from a driver by comparing actual fuel efficiency with reference fuel efficiency according to an operation habit of an operator.

Figure 2:
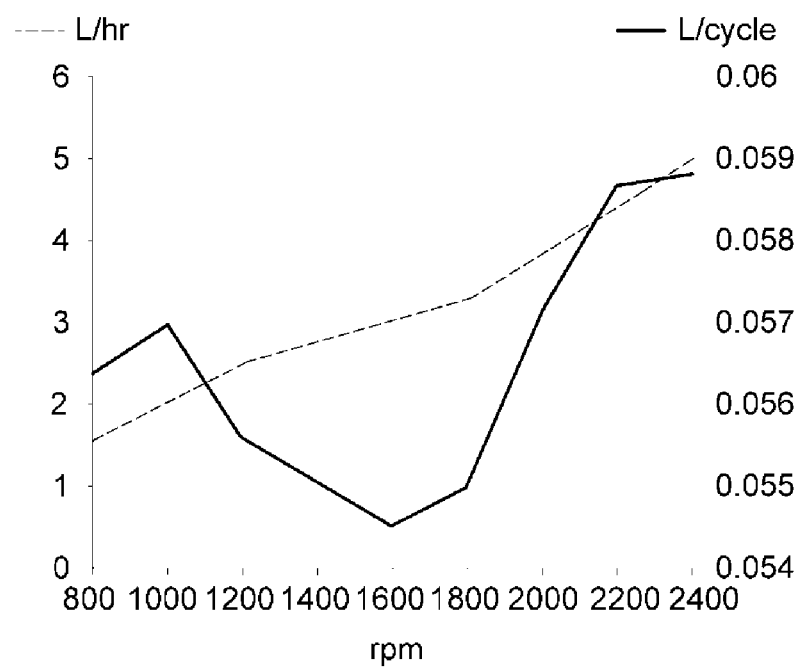
FIG. 2 is a diagram illustrating an exemplary embodiment of reference fuel efficiency.
Figure 3:
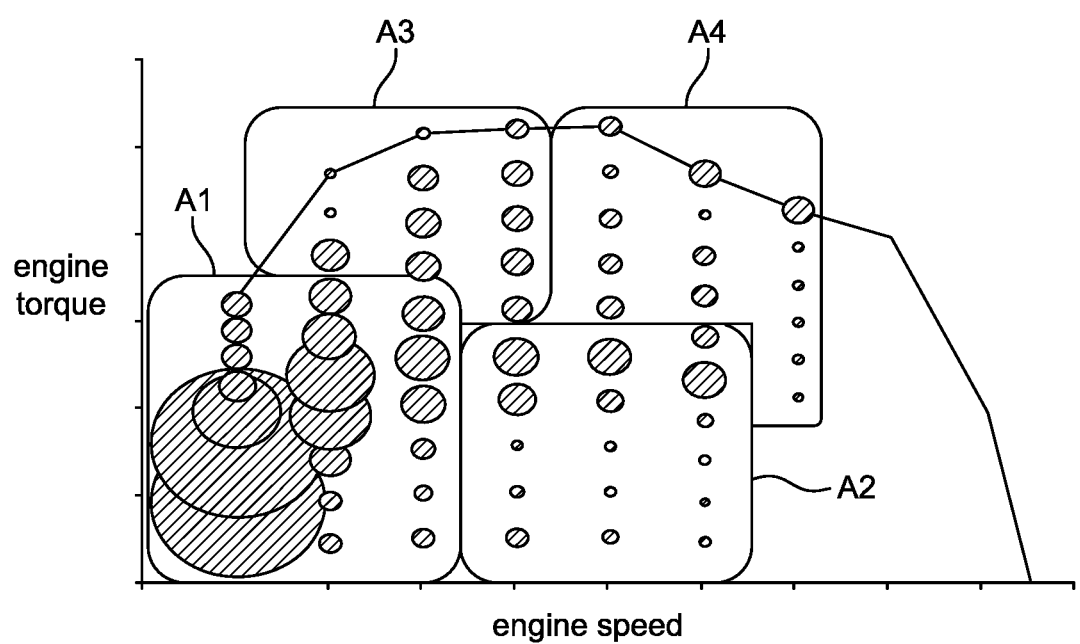
FIG. 3 is a diagram illustrating an exemplary embodiment, in which a usage region of engine used data is divided.
Figure 4:
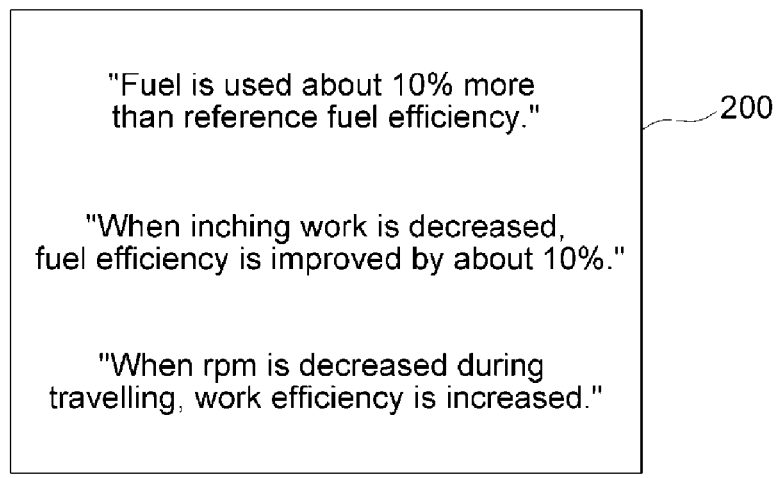
FIG. 4 is a diagram illustrating an exemplary embodiment of a guide message displayed on a display module.

FIG. 1 is a diagram illustrating a general configuration of an industrial vehicle work guide system according to an exemplary embodiment of the present invention. FIG. 2 is a diagram illustrating an exemplary embodiment of reference fuel efficiency, FIG. 3 is a diagram illustrating an exemplary embodiment, in which a usage region of engine used data is divided based on a basic operation of an industrial vehicle, and FIG. 4 is a diagram illustrating an exemplary embodiment of a guide message displayed on a display module.

Referring to FIG. 1, the industrial vehicle work guide system according to the exemplary embodiment of the present invention may include an analysis module 100, a display module 200, an electronic control unit 300, a load sensor 400, and a memory 500.

The electronic control unit 300 controls various devices including an engine of the industrial vehicle. The memory 500 may store information including engine used data, a driving time, and a fuel consumption amount of the industrial vehicle. The engine used data, the driving time, and the fuel consumption amount stored in the memory 500 may be provided from the electronic control unit 300.

The engine used data is engine-related information stored when the industrial vehicle is driven. As illustrated in FIG. 3, the engine used data may include engine speed and engine output information. The engine used data may be accumulated and stored according to the driving of the industrial vehicle. The accumulated time, in which the engine used data is stored, may be different according to a storage capacity of the memory 500. When the engine used data exceeds the storage capacity of the memory 500, the engine used data may be accumulated and stored in a scheme in which the first input engine used data is first deleted.

The load sensor 400 measures weight of cargo loaded on the industrial vehicle. The load sensor 400 may measure pressure generated by the weight of the cargo and transmit the measured pressure to the electronic control unit 300 and the memory 500. For example, the load sensor 400 may measure pressure applied to a fork of a construction machine.

The display module 200 may be controlled by the analysis module 100 according to the analysis result of the analysis module 100 and display a guide message.

The analysis module 100 may calculate actual fuel efficiency of the industrial vehicle operated by an operation of an operator, and compare the calculated actual fuel efficiency with reference fuel efficiency, and control the display module 200 so that the display module 200 outputs a guide message corresponding to the comparison result.

The analysis module 100 may receive the engine used data, the driving time, the fuel consumption amount, and the cargo weight information from the memory 500, and analyze an operation pattern of the operator based on the received engine used data, driving time, fuel consumption amount, and cargo weight information. In this case, the fuel consumption amount information transferred from the memory 500 to the analysis module 100 may include information about a fuel consumption amount within the most recent one hour.

The reference fuel efficiency is a value serving as a reference for comparing the actual fuel efficiency when the industrial vehicle is operated by the operation of the operator. The reference fuel efficiency may be fuel efficiency when the industrial vehicle performs reference work. Accordingly, in order to set the reference fuel efficiency that is the comparison reference of the actual fuel efficiency, the reference work may be set.

The reference work may consist of two or more basic work. The basic work is a basic unit of work, which the industrial vehicle may perform, and may include load loading and unloading work, inching work, travelling work, and complex operation work. For example, the reference work may be a standard work mode of a Verband Deutscher Ingenieure ("VDI") test mode that is a forklift fuel efficiency test mode. The reference work may consist of a combination of various basic work, which the industrial vehicle may perform, in addition to the foregoing work.

When the industrial vehicle performs each basic work, the engine used data is represented in a specific pattern. As illustrated in FIG. 3, when the industrial vehicle performs load loading/unloading work, the engine used data is positioned in region A1, in which an engine speed is low and an engine output is low. When the industrial vehicle performs inching work, the engine used data is positioned in region A2, in which an engine speed is high and an engine output is low. When the industrial vehicle performs travelling work, the engine used data is positioned in region A4, in which an engine speed is high and an engine output is high. When the industrial vehicle performs complex operation work, the engine used data is positioned in region A3, in which an engine speed is low and an engine output is high. As described above, the engine used data represents different patterns according to the kind of performed basic operation, so that it is possible to calculate a ratio of each of the basic work of the reference work based on the pattern. A ratio of each of the load loading/unloading work, the inching work, the travelling work, and the complex operation work of the reference work may be stored in the memory 500.

When the reference work is determined, reference fuel efficiency may be set based on the determined reference work. The reference fuel efficiency may include fuel efficiency (L/hr), a work amount per hour (Cycle/hr), and work efficiency (L/Cycle). The reference fuel efficiency may be pre-set by a method, such as a test, and stored in the memory 500.

The fuel efficiency (L/hr) may be defined with a fuel consumption amount (l) per driving time (hr) of the industrial vehicle. The analysis module 100 may receive the fuel consumption amount (l) and the driving time from the electronic control unit 300 and calculate fuel efficiency (L/hr).

The work amount (Cycle/hr) per hour may be defined with a work cycle (Cycle) per driving time (hr). In this case, the work cycle (Cycle) is a work unit consisting of two or more reference work for performing specific work performed by the industrial vehicle. For example, in the case of work of lifting cargo laid on a floor and loading the cargo on a vehicle located in another place, from the work of lifting the cargo laid on the floor to the work of loading the cargo on the vehicle through the travelling work is one cycle, and the cycle may be repeatedly performed.

The work efficiency (L/Cycle) may be defined with a fuel consumption amount (l) per one work cycle (Cycle). The analysis module 100 may calculate work efficiency (L/Cycle) based on the calculated fuel efficiency (L/hr) and work amount per hour (Cycle/hr).

Each of the reference fuel efficiency may be pre-set by a test, and may be set based on each weight of cargo and each engine speed. FIG. 2 illustrates a relation between fuel efficiency (L/hr) and work efficiency (L/Cycle) based on each engine speed for specific cargo weight.

When the reference fuel efficiency is set, the set reference fuel efficiency is stored in the memory 500 of the industrial vehicle. In this state, the industrial vehicle is driven and performs work, so that the information, such as the engine used data, the driving time, and the fuel consumption amount, for calculating actual fuel efficiency is accumulated in the memory 500. Accordingly, the analysis module 100 may calculate actual fuel efficiency of the industrial vehicle based on the information provided from the memory 500 and the load sensor 400.

The fuel efficiency (L/hr) may be calculated by dividing the fuel consumption amount by the driving time. As necessary, the fuel efficiency (L/hr) may be calculated based on the fuel consumption amount within the most recent one hour.

The analysis module 100 may calculate a work cycle of construction machinery based on pressure information received from the load sensor 400. For example, the construction machinery generally performs an operation of lifting cargo, travelling, and unloading the cargo again, and in this case, the operation of lifting the cargo increases pressure detected by the load sensor 400 and the operation of unloading the cargo decreases pressure detected by the load sensor 400. Accordingly, a time point, at which the pressure detected by the load sensor 400 is increased, to a time point, at which the pressure detected by the load sensor 400 is decreased, may be calculated as one work cycle, and the analysis module 100 may calculate the number of work cycles performed based on the pressure information received from the load sensor 400. The work amount per hour (Cycle/hr) may be calculated by using the calculated work cycle (Cycle).

The analysis module 100 may calculate work efficiency (L/Cycle) based on the calculated fuel efficiency (L/hr) and work amount per hour (Cycle/hr).

The analysis module 100 may calculate actual fuel efficiency based on each engine speed. In this case, the engine speed may be set with a section. In this case, the section may be set for every 100 rpm. Accordingly, the analysis module 100 may calculate actual fuel efficiency based on each engine speed section, such as actual fuel efficiency in a section of 800 rpm and actual fuel efficiency in a section of 900 rpm.

Further, the analysis module 100 may analyze the engine used data, and extract an engine speed which the operator most frequently uses.

Further, the analysis module 100 may classify the engine used data to one of the plurality of basic work by substituting the engine used data to the preset reference, such as the reference illustrated in FIG. 3, and then calculate a ratio between the plurality of basic work. As described above, the plurality of basic work may be the load loading/unloading work, the inching work, the travelling work, and the complex operation work.

The analysis module 100 compares the actual efficiency with the reference fuel efficiency at each engine speed. For example, the analysis module 100 compares the actual fuel efficiency (L/hr), the actual work amount per hour (Cycle/hr), and the actual work efficiency (L/Cycle) at 1,600 rpm with the reference fuel efficiency. The analysis module 100 may compare the actual fuel efficiency with the reference fuel efficiency, and when the actual fuel efficiency is lower than the reference fuel efficiency, the analysis module 100 may output a guide message through the display module 200. In this case, the guide message may include, for example, "use the neutral mode, rather than inching, during load work" and "when an accelerator pedal is less used by 10% during work, work efficiency is increased 10%".

Further, the analysis module 100 may compare the extracted most frequent engine speed of the operator with the most efficient engine speed, and then output the guide message so that the most frequent engine speed of the operator is close to the most efficient engine speed. In this case, the most efficient engine speed may be set by a test in advance, and be, for example, 1,600 rpm, at which the work efficiency (L/Cycle) is highest in FIG. 2.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the scope of the present invention.

INDUSTRIAL APPLICABILITY

In the industrial vehicle work guide system according to the present invention, actual fuel efficiency of an operator is compared with reference fuel efficiency by the analysis module and when the actual fuel efficiency is lower than reference fuel efficiency, a guide message is output through the display module, thereby effectively improving fuel efficiency of the industrial vehicle regardless of a skill level of the operator.

| [Description of Main Reference Numerals of Drawings] | |
|---|---|
| 100: Analysis module | 200: Display module |
| 300: Electronic control unit | 400: Load sensor |
| 500: Memory | |

The invention claimed is:

1. An industrial vehicle work guide system, comprising:
a memory configured to store engine used data, a driving time, a fuel consumption amount, and reference fuel efficiency;
a display module configured to output a guide message;
an analysis module configured to calculate actual fuel efficiency by using the engine used data, the driving time, and the fuel consumption amount, compare the actual fuel efficiency with the reference fuel efficiency, and control the display module so that the display module outputs a guide message when the actual fuel efficiency is lower than the reference fuel efficiency; and
a load sensor configured to measure weight of the cargo loaded on the industrial vehicle,
wherein the reference fuel efficiency includes a work amount per hour defined with a work cycle per driving time, and
wherein the analysis module is configured to define one work cycle from a time point in which a pressure sensed by the load sensor is increased to a time point in which the pressure sensed by the load sensor is decreased, to calculate the number of work cycles based on the pressure measured by the load sensor, and to calculate the work amount per hour using the calculated work cycles.

2. The industrial vehicle work guide system of claim 1, wherein the engine used data includes information about an engine speed and an engine output.

3. The industrial vehicle work guide system of claim 2, wherein the analysis module extracts a most frequently used engine speed from the engine used data, compares the most frequently used engine speed with a preset most efficient engine speed, and outputs the guide message through the display module so that the most frequently used engine speed is close to the most efficient engine speed.

4. The industrial vehicle work guide system of claim 1, wherein the reference fuel efficiency is fuel efficiency when reference work consisting of two or more of load loading/unloading work, inching work, traveling work, and complex operation work is performed.

5. The industrial vehicle work guide system of claim 1, wherein the reference fuel efficiency includes fuel efficiency defined with a fuel consumption amount per driving time.

6. The industrial vehicle work guide system of claim 1, wherein the reference fuel efficiency includes work efficiency defined with a fuel consumption amount per work cycle.

7. The industrial vehicle work guide system of claim 1, wherein the reference fuel efficiency is set based on each cargo located on the industrial vehicle and each engine speed.

* * * * *